Sept. 29, 1942.    G. J. HUGHES    2,297,355
PRESSURE FLUID ENGINE CONTROL
Filed April 15, 1941    2 Sheets-Sheet 1
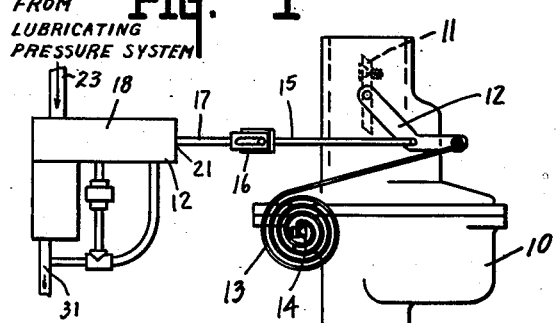
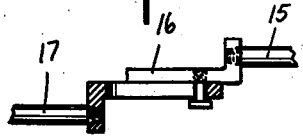
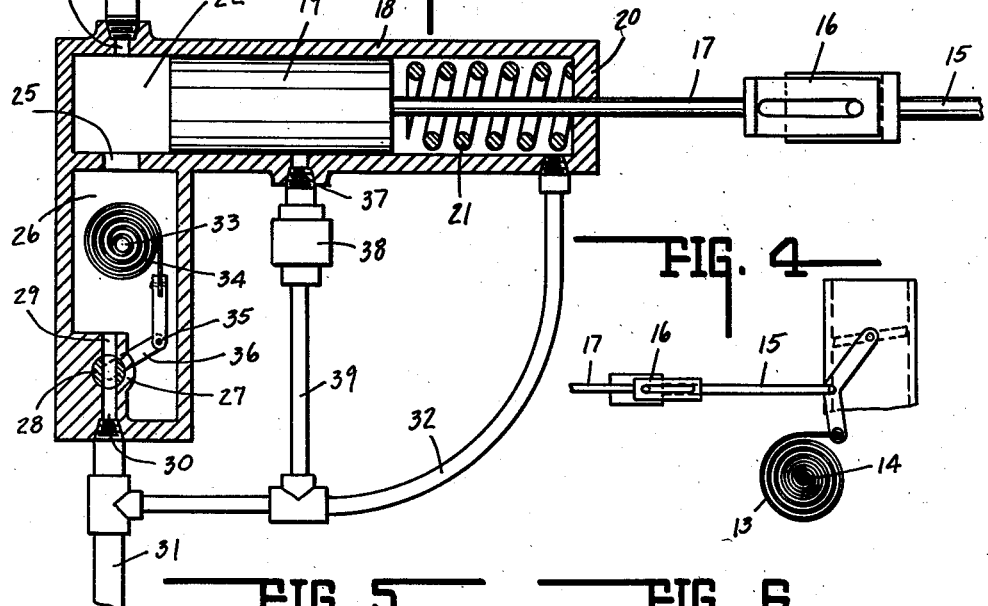
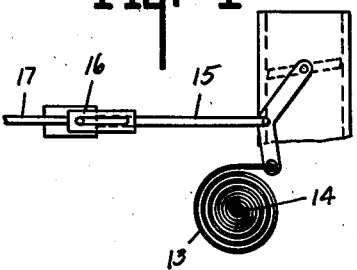
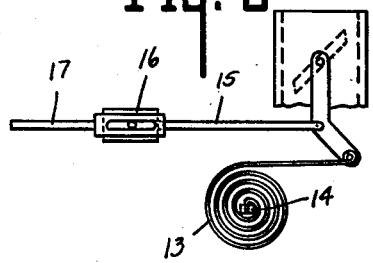
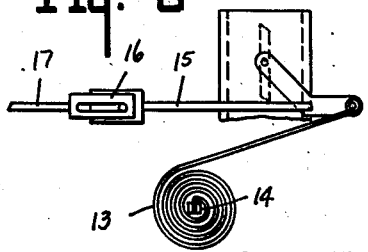
INVENTOR.
GEORGE J. HUGHES.
BY Lockwood, Goldsmith & Galt.
ATTORNEYS.

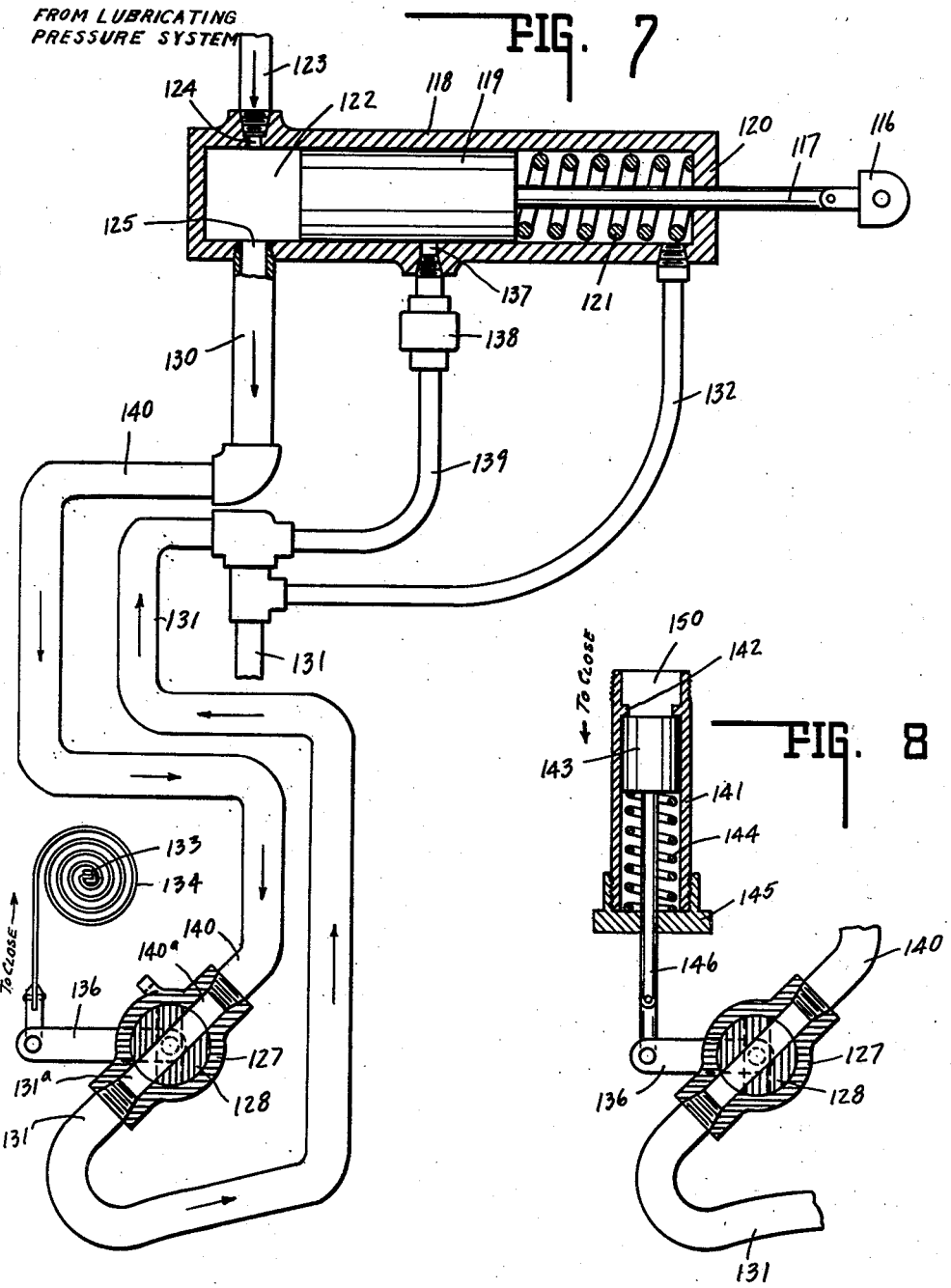

Patented Sept. 29, 1942

2,297,355

UNITED STATES PATENT OFFICE 2,297,355

PRESSURE FLUID ENGINE CONTROL

George J. Hughes, Pendleton, Ind.

Application April 15, 1941, Serial No. 388,655

18 Claims. (Cl. 123—119)

This invention in its various forms relates to a hydraulic control assembly for the control of the operation of internal combustion engines utilized for powering vehicles, refrigeration systems or pressure systems.

The chief object of this invention is to provide a construction which is automatically responsive to certain factors whereby the control deriving its power from the internal combustion engine, the source of power for the load, may be automatically controlled.

One form of the invention is disclosed as applicable to an automotive application and has specific application to the regulation of the air-to-fuel ratio of a mixture in the starting and subsequent operation of such an engine and which construction may be rapidly and readily applied to a conventional, automatically operable, thermostatically controlled choke construction for such an engine.

Another form of the invention relates to a control of hydraulic type for automatically decelerating or accelerating internal combustion engines used as a power element for devices for either the control of temperatures or pressures, as hereinafter pointed out.

One embodiment of the last mentioned form of the invention is automatically responsive to temperature conditions to regulate the operation of an engine, the temperature conditions being responsive to the operation by said engine of a refrigerating system including said engine as the source of power therefor.

Another embodiment of the last mentioned form of the invention is automatically responsive to pressure conditions to regulate the operation of an engine, the pressure conditions being responsive to the operation by said engine of a pressure creating system including said engine as the source of power therefor.

A conventional internal combustion engine driving powering apparatus where differing temperatures make a differing engine speed desirable may be utilized to advantage with the first mentioned form of the second modification of the invention. The same provides an automatic control responsive to said differing temperature conditions which control will decelerate or accelerate the engine according to the minimum or maximum temperatures desired in the refrigerating system operation.

A conventional internal combustion engine driving powered apparatus where different pressures make different engine speeds desirable may be utilized to advantage with the second mentioned form of the second modification of the invention. The same provides an automatic control responsive to differing pressure conditions which control will decelerate or accelerate the engine according to the maximum or minimum pressures desired in the engine powered pressure producing system.

The chief feature of the invention consists in providing an automatic control responsive to a variable factor for the automatic control of an engine, the same being the source of power for apparatus, the condition of which it is desirable to automatically regulate through engine speed regulation.

Other objects and features of the invention will be set forth more fully hereinafter.

The full nature of the invention will be understood from the accompanying drawings, the following description and claims:

In the drawings,

Fig. 1 is a diagrammatic elevational view of one embodiment of the invention.

Fig. 2 is a central sectional view of a portion thereof, and the novel portion more particularly.

Fig. 3 is a top plan view of a "slip" link connection, with parts shown in section.

Figs. 4, 5 and 6 are diagrammatic views of the choke valve of an engine in different positions under different conditions of engine compartment temperature conditions.

Fig. 7 is a sectional view of the power portion of a modified form of the invention and is a diagrammatic view of a thermostatic responsive pressure liquid control valve capable of utilization with said modified power embodiment.

Fig. 8 is a diagrammatic view of a pressure responsive, pressure liquid control valve modification capable of utilization with the power modification embodiment illustrated in Fig. 7.

In Fig. 1 of the drawings, 10 indicates a conventional carburetor including therein a choke valve 11 having an actuating arm 12 or bell crank. There is also illustrated a conventional scroll type thermostat 13 mounted at 14 and having its free end connected to arm 12 for valve movement in accordance with engine compartment temperature conditions.

The specific details of the thermostat mounting, its proper adjustment, etc., have intentionally been omitted since the aforesaid is all conventional structure. Suffice to say that valve 11 is always responsive to engine compartment temperature conditons subject to the aforesaid adjustments.

Connected to the bell crank or arm 12 is a rod 15, see Figs. 1 to 6. A slip connection 16 at the other end of rod 15 is interposed between said rod and rod or stem 17. Reference will now be had more particularly to Fig. 2 for an illustration of the parts now to be described. Thereafter, the operation thereof will be set forth briefly.

A cylinder 18 slidably supports a piston 19 and the rod 17 is secured at its opposite end thereto and passes through the end 20 of the cylinder 18. A coil spring 21 is interposed between piston 19 and end 20. When extended it may not engage piston 19 (see Fig. 2) when the piston is at the left-hand end of its stroke.

The other end of cylinder 18 includes chamber 22, and the face of piston 19 exposed therein is subject to the pressure, if any, in said chamber. A line 23 has restricted communication at 24 with said chamber 22. This line is connected to the engine lubrication system downstream of the relief or pressure regulator in such system and the requirements of line 23 are such that no part of the engine is starved or deprived of proper lubrication.

A discharge port 25 larger than inlet 24 permits discharge of oil into the well arrangement 26. Included in this well is a valve chamber 27 in which is mounted valve 28. Chamber 27 communicates with well 26 at 29 and discharges at 30 to waste line 31 or the return line to the oil sump of the engine.

If desired, a drain line 32 may connect the spring including end of cylinder 18 with line 31 to relieve any leakage past piston 19. Normally, piston 19 has such a fit that no oil leaks past the same.

Mounted in well 26 on shaft 33 is a scroll or other suitable type of thermostat 34, the free end (a rod) of which is connected as at 35 to the bell crank 36 in the well 26. Said bell crank is connected to the valve 28.

It will be apparent that shortly after the engine has started operation the oil temperature will be substantially that of the engine oil hence thermostat 34 is responsive to such engine temperature changes. These changes control the position of valve 28 restricting or opening the port 29 and thereby control the amount of pressure, if any, applied in chamber 22 to piston 19.

The carburetor mounted thermostat 13 operates the choke valve independently of the control shown in Fig. 2, the position of the choke valve 11 being in direct relationship to engine compartment temperatures, but fully closed by reason of the proper calibration of the thermostat at 70° F.

Whenever temperature conditions in the engine compartment are such that the choke valve 11 is fully closed the position of valve 28 is in its widest open position due to the temperature of the oil which acts upon thermostat 34. This wide open position of valve 28 is not full open, the valve 28 being so set as to cause a slight restriction of oil flow after the engine has been started. This valve positioning is such as to cause enough oil pressure to be built up, when the engine is started, in chamber 22 to move the piston 19 until it meets the opposition of spring 21. This piston movement moves rod 17, the slip link 16 and the rod 15 to open the choke valve 11 sufficient to permit continued engine operation without overchoking. This opening of valve 11 is of a minor amount.

As the engine warms up the lubricating oil is likewise warmed which causes movement of the thermostat 34 to move the valve 28 to a further closing position. This further restriction increases oil pressure in chamber 22 to cause a further movement of the piston 19 in opposition to the spring 21 causing a further opening of the choke valve 11 against the resistance of the carburetor mounted thermostat 13. It can be seen that the closing of the valve 28 is gradual as the thermostat 34 is affected by increasing oil temperatures; thus causing a gradual opening of the choke valve 11 until the piston 19 reaches the end of its movement to the right and the choke valve 11 is in a wide open position.

When the piston 19 has reached the end of its right-hand stroke oil pressure continues to increase in chamber 22. To prevent excessive pressures at end 20, there is provided a drain line 37, a pressure relief valve 38 and a waste line 39 which connects to the oil return line 31. The relief valve 38 is spring loaded sufficient so as not to permit the opening of the valve until excessive pressures are built up in chamber 22.

The slip connection 16 is of pin and slot character. This permits the thermostat 13 to move the rod 15 without in any way affecting rod 17. As illustrated in Figs. 1 and 3, the position of the parts are as would be on a warm day or when the air under the hood is warm, and the engine not running.

With the starting of the engine the structure as shown in Fig. 2 would move the rod 17 and reach the end of its travel without in any way affecting rod 15. Under any other temperature conditions, however, the position of the pin in the slot structure would be at some point to the left in the slot, induced by under hood temperatures working on thermostat 13, the gradual movement of the rod 17 to the right as the engine warms taking up any slack in the slot, if any, to begin moving the rod 15 as the engine warms until the rod 17 is at the right end of its travel, and the choke valve 11 is in a wide open position.

The foregoing structure is one that functions regardless of the make or model of the engine working equally as well on same so long as the carburetor thereof is equipped with a thermostatic choke.

Fig. 4 shows the choke valve "closed". When the day is cold and the engine is cold the well valve (not shown in Fig. 4) is in widest open position and rod 17 is positioned to the left as far as possible.

Fig. 5 shows the choke valve part open. This indicates the engine compartment temperatures are sufficiently warm so as to cause a part opening of the choke valve 11 by the thermostat 13, and to cause a part reduction, when starting, of air-to-fuel ratio. The rod 15 with connection 16 has shifted to the right impelled by the thermostat 13.

Fig. 6 shows the choke valve wide open. The engine compartment is warm or the day is warm so the carburetor thermostat is full open. The engine is warm so the full oil pressure is applied to rod 17 and it is at its extended right position after the engine has been started.

Note that between Figs. 4 and 5 and Figs. 5 and 6, the engine temperature may vary and as it warms up the engine control will be imposed upon the choke valve so that proper choking for the then operating condition of the engine will be provided.

When the engine operates normally the choke valve is wide open and the piston 19 is positioned in its extreme right position and the well valve is fully closed.

The resulting automatic control insures proper choking for all conditions of engine operation or no choking under normal engine operation.

Reference will now be had to Figs. 7 and 8. In these figures, numerals of the 100 series indicate parts like or similar to parts illustrated in Figs. 1 to 6 and indicated by numerals of the primary series.

It will be seen from an examination of the several figures that the only constructional differences between the structures illustrated primarily in Fig. 2 and Fig. 7 is that in the first embodiment of the invention the pressure liquid control valve is located within the power control structure while in the latter embodiment the pressure liquid control valve is positioned adjacent to or remote from the structure itself. Therefore, it may be utilized in accordance with the utilization of the first embodiment of the invention, that is, being responsive to pressure liquid temperature change but which is also, and more especially, adapted to be responsive to temperature changes of some other medium.

It will also be understood that the only structural differences between the structures illustrated in Figs. 7 and 8 is that in the first embodiment mentioned the pressure liquid control valve is responsive to temperature changes in that liquid while in the second form of that invention the pressure liquid control valve is responsive to pressure changes only.

In the upper portion of Fig. 7, there is illustrated a cylinder 118 which slidably supports a piston 119 having the rod 117 secured thereto. This rod passes through the end 120 of the cylinder 118. A coil spring 121 is interposed between piston 119 and end 120. When extended it engages the end of piston 119 when the piston is at the left-hand end of its stroke. Note in Fig. 2 the spring does not contact the piston when in extreme left-hand position.

A discharge port 125, larger than inlet port 124, permits discharge of oil into the line 130 which is connected to line 140, this line in turn connecting with the valve structure 127. This latter structure, when the valve member 128 is in open position, discharges at 131a to the waste line 131 or the return line to the oil sump of the engine.

The other end of cylinder 118 includes a chamber 122 with intake port 124 and outlet port 125 before mentioned, and the chamber exposed face of the piston 119 is subject to the pressure, if any, in said chamber. A pressure supply line 123 has restricted communication at 124 with said chamber 122. This line is connected to engine lubrication system downstream of the relief or pressure regulator in such system. The requirements of line 123 are such that no part of the engine is starved or deprived of proper lubrication.

If desired, a drain line 132 may connect the spring including end of cylinder 118 to waste line 131 to relieve any leakage past piston 119. Normally, piston 119 has such a fit that no oil leaks past the same.

Attached to arm 136 of valve 128 is a scroll or other suitable type of thermostat 134, which thermostat is held centrally fixed as at 133, the thermostat being calibrated for movement at a given, desired temperature.

Link 116 is attached to the bell crank of the engine carburetor throttle shaft, not illustrated, in such position that when the piston 119 is at the left-hand end of its stroke, the carburetor throttle valve, not illustrated, is in an open position at least sufficient to permit the engine to operate at the predetermined full load speed.

So that the complete operation of this device may be understood, the following description, by way of illustration only is given, the combination device in this instance, it being understood, being applied to an engine driven refrigeration system.

The valve and thermostat assembly shown in the lower portion of Fig. 7 is installed within the refrigerator or at any other point where the thermostat thereof will be exposed to the predetermined maximum of cold. The necessary pipe lines 131 and 140 in proper lengths are then attached to the valve 127 and to the valve outlet 131a and the valve inlet 140a. Line 131 is the waste line. In this case, the lines 131 and 140 and the valve 127 should be properly insulated to protect thermostat 134 from being responsive to heat from high engine oil temperatures when it is not intended to operate in accordance with said oil temperatures.

To start the engine, the rod 117 is manually pulled to the right by cable or other means (not shown) until the carburetor throttle valve is in an idling position, and held in this position until the engine has been properly warmed. Thereafter, this manual control may be released, permitting the carburetor throttle valve to open and the rod 117 to return caused by the spring 121 opposing the piston 122.

Since the engine has just been started and the temperature of the refrigerator system is above the desired low temperature, thermostat 134 is at rest and the valve 128 is in a wide open position. This permits oil (pressure liquid) to flow freely through the entire system illustrated and to the crankcase by means of the waste pipe 131.

As soon as the predetermined desired low temperature is reached, the thermostat 134 contracts to move the valve arm 136 which in turn starts the closing of valve 128. This restricts line 140 causing oil pressure to build up in chamber 122. This oil pressure moves the piston 119 to the right in opposition to spring 121. This piston movement also moves rod 117 and the link 116 thereby causing a partial closure of the carburetor throttle valve (not shown) to reduce engine speed.

As temperature continues to decrease there is a further movement of the thermostat 134 to cause a further closing of the valve 128 to increase the pressure within the chamber 122 which causes a further movement of the piston 119 and the rod 117 to the right to further decrease engine speed.

It can be seen that with a further reduction of temperature the valve 128 will be brought to a fully closed position, causing a movement of parts that reduces engine speed to a slow idle. When this occurs the piston 119 is at the end of its right-hand travel, but pressures continue to build up within chamber 122. When these pressures exceed the preloaded value of the relief valve 138, this valve opens to spill the excess pressures through the waste line 139 to the waste line 131. This device reduces engine speed and holds same to a slow idle until temperature within the refrigeration system again rises.

When temperatures within the refrigeration system increase above the predetermined desired low temperature, the thermostat 134 uncoils to open the valve 128 to relieve pressure in chamber 122 below the maximum relief valve pressure thereby causing a return of the piston 119 and the rod 117 by spring 121 to increase the speed of the engine.

When temperatures within the refrigeration system again fall below the predetermined desired low temperature the first cycle mentioned is again repeated insofar as bringing the engine down to a slow idle.

While a description of the operation of the combination device is applied to an engine driven refrigeration system, or cold making system, it can be understood that the same combination will operate equally well when it is desired to control high temperatures through the deceleration or acceleration of the engine, this being accomplished by the proper positioning and adjusting of the calibrated thermostat.

Reference will now be had to Fig. 8. The thermostat 134 in Fig. 7 for the pressure modification to be described, it is to be understood, is replaced with the spring loaded pressure responsive piston assembly shown in detail in Fig. 8.

The pressure piston assembly is screwed into the pressure line or the pressure tank of the apparatus to be controlled, this application being made either adjacent to or remote from the engine itself. The lines 131 and 140, see Fig. 7, are connected as shown in Fig. 8 to the valve 127.

The spring 144 in cylinder 141 is calibrated for the desired predetermined pressure within the pressure tank or pressure line, an adjusting screw 145 being provided to facilitate this calibration.

When the pressure within the pressure tank or pressure line (not illustrated) exceeds the predetermined desired pressure, the piston 143 in cylinder 141 overcomes the opposition of the spring 144 closing the valve 128 by means of rod 146. This valve closing builds up pressure in chamber 122 to cause a reduction in engine speed, as previously described.

When the pressure within the pressure tank or line falls below the predetermined desired pressure, the spring 144 forces the return of the piston 143, opening the valve 128 to cause a loss of pressure in chamber 122 permitting the return of the piston 119 caused by the spring 121 for the increase in engine speed.

These cycles are repeated with each increase or decrease in pressure tank or pressure line above or below the desired predetermined pressure. Such pressure is applied to the piston 143 in cylinder 141 at 150. Such pressure also can be either liquid or gaseous. The pressure responsive member (piston 143) may be replaced by a diaphragm. This mechanical substitution is preferred when the pressure medium applied at 150 is of gaseous type.

The excess pressure relief valve illustrated in Fig. 7 similarly functions, as previously described, in the combination similar to that illustrated in Fig. 7 but wherein the thermostat control therein has been replaced by the pressure responsive structure illustrated in Fig. 8.

While the invention has been illustrated and described in great detail in the foregoing description, the same is to be considered as illustrative and not restrictive in character.

The several modifications described herein, as well as others which will readily suggest themselves to persons skilled in this art, are all considered to be within the broad scope of the invention, reference being had to the appended claims.

The invention claimed is:

1. In an engine having a thermostatic controlled choke valve, the combination of an engine operable pressure liquid system, means responsive to such pressure, means controlling the application of pressure to such pressure responsive means in accordance with temperature of the liquid, and means operatively connecting the pressure responsive means to the choke valve for control of the latter by the former.

2. In an engine having a thermostatic controlled choke valve, the combination of an engine operable pressure liquid system, means responsive to such pressure, means controlling the application of pressure to such pressure responsive means in accordance with temperature of the liquid, and means operatively connecting the pressure responsive means to the choke valve for control of the latter by the former, such connecting means including a slip connection permitting choke valve operation independent of the pressure control.

3. In an engine having a thermostatic controlled choke valve, the combination of an engine operable pressure liquid system, means responsive to such pressure, means controlling the application of pressure to such pressure responsive means in accordance with temperature of the liquid, and means operatively connecting the pressure responsive means to the choke valve for control of the latter by the former, such connecting means including a slip connection permitting choke valve operation in response to thermostatic and pressure responsive means control and in accordance with the requirements of both.

4. In combination with a carburetor having a thermostatically controlled choke valve, a pressure responsive control for said valve, a slip connection between the control and valve, engine pressure fluid supply means for the pressure control, and thermostatic means responsive to engine temperature controlling pressure application to the pressure responsive means.

5. A control for a thermostatically controlled choke valve including in combination a rod having operative connection to the choke valve, a chamber, a pressure movable means therein adapted for constraint to the valve closed position and connected to the rod, a pressure fluid supply to the chamber, a thermostat responsive to the temperature of the fluid in the chamber, and a valve controlled outlet from the chamber subject to said thermostat, the outlet opening in proportion to temperature increase.

6. A control as defined by claim 5, characterized by the addition of a well between the chamber and outlet, the thermostat being exposed to the fluid therein.

7. A control as defined by claim 5, characterized by the chamber being of cylinder type and the pressure movable means comprising a piston, and a drain from the cylinder opposite the pressure end thereof for the purpose described.

8. A control for a variable speed engine including in combination with an engine control and engine operable pressure liquid system, means responsive to such pressure for engine control, valve means controlling the application of pressure liquid to said pressure responsive means, means for automatically controlling said valve means, and means operatively connecting the pressure responsive means to said engine control for engine control by pressure and in accordance with the second last mentioned means operation of the valve means.

9. A control as defined by claim 8, characterized by the first mentioned pressure responsive means including a cylinder and a piston subject to cylinder pressure and normally under constraint, the constraint including a spring in said first mentioned means cylinder opposite the pressure end thereof.

10. A control as defined by claim 8, characterized by the first mentioned means including a cylinder and a piston under constraint, including a spring in the cylinder opposite the pressure end thereof, and a drain from the cylinder opposite the pressure end thereof for the purpose described.

11. A control for a variable speed engine, including in combination with an engine operable pressure liquid system, means responsive to such pressure, means controlling the application of such pressure to said pressure responsive means, means controlling the second mentioned means and responsive to temperatures in correlation with engine operation, and means operatively connecting the pressure responsive means to the engine for the control of the latter by the former and in accordance with the control of the second last mentioned means.

12. A control for variable speed engine, including in combination with an engine operable pressure liquid system, means responsive to such pressure, means controlling the application of such pressure to said pressure responsive means, means controlling the second mentioned means responsive to pressures in correlation with engine operation, and means operatively connecting the pressure responsive means to the engine for the control of the latter by the former and in accordance with the control of the second last mentioned means.

13. A control for a variable speed engine, including in combination with an engine operable pressure liquid system, means responsive to such pressure, means controlling the application of such pressure to said pressure responsive means, means controlling the second mentioned means and responsive to temperatures in correlation with engine operation, means operatively connecting the pressure responsive means to the engine for the control of the latter by the former and in accordance with the control of the second last mentioned means, and excessive pressure operable relief valve including means connected to the first mentioned pressure responsive means at one end and bypassing the means controlling the application of pressure to such pressure responsive means.

14. A control for variable speed engine, including in combination with an engine operable pressure liquid system, means responsive to such pressure, means controlling the application of such pressure to said pressure responsive means, means controlling the second mentioned means responsive to pressures in correlation with engine operation, means operatively connecting the pressure responsive means to the engine for the control of the latter by the former and in accordance with the control of the second last mentioned means, and excessive pressure operable relief valve including means connected to the first mentioned pressure responsive means at one end and bypassing the means controlling the application of pressure to such pressure responsive means.

15. A control for a variable speed engine, including in combination with an engine operable pressure liquid system, means responsive to such pressure, means controlling the application of such pressure to said pressure responsive means, means controlling the second mentioned means and responsive to temperatures in correlation with engine operation, and means operatively connecting the pressure responsive means to the engine for the control of the latter by the former and in accordance with the control of the second last mentioned means, the second mentioned means including a valve automatically movable through a range of positions in accordance with the requirements of the apparatus powered by the engine.

16. A control for variable speed engine, including in combination with an engine operable pressure liquid system, means responsive to such pressure, means controlling the application of such pressure to said pressure responsive means, means controlling the second mentioned means responsive to pressures in correlation with engine operation, and means operatively connecting the pressure responsive means to the engine for the control of the latter by the former and in accordance with the control of the second last mentioned means, the second mentioned means including a valve automatically movable through a range of positions in accordance with the requirements of the apparatus powered by the engine.

17. A control for a variable speed engine, including in combination with an engine operable pressure liquid system, means responsive to such pressure, means controlling the application of such pressure to said pressure responsive means, means controlling the second mentioned means and responsive to temperatures in correlation with engine operation, means operatively connecting the pressure responsive means to the engine for the control of the latter by the former and in accordance with the control of the second last mentioned means, and excessive pressure operable relief valve including means connected to the first mentioned pressure responsive means at one end and bypassing the means controlling the application of pressure to such pressure responsive means, the second mentioned means including a valve automatically movable through a range of positions in accordance with the requirements of the apparatus powered by the engine.

18. A control for variable speed engine, including in combination with an engine operable pressure liquid system, means responsive to such pressure, means controlling the application of such pressure to said pressure responsive means, means controlling the second mentioned means responsive to pressures in correlation with engine operation, means operatively connecting the pressure responsive means to the engine for the control of the latter by the former and in accordance with the control of the second last mentioned means, and excessive pressure operable relief valve including means connected to the first mentioned pressure responsive means at one end and bypassing the means controlling the application of pressure to such pressure responsive means, the second mentioned means including a valve automatically movable through a range of positions in accordance with the requirements of the apparatus powered by the engine.

GEORGE J. HUGHES.